No. 675,492. Patented June 4, 1901.
A. MARTIN.
APPARATUS FOR CUTTING HUMAN HAIR OR CLIPPING ANIMALS.
(Application filed Nov. 19, 1900.)
(No Model.) 2 Sheets—Sheet 1.
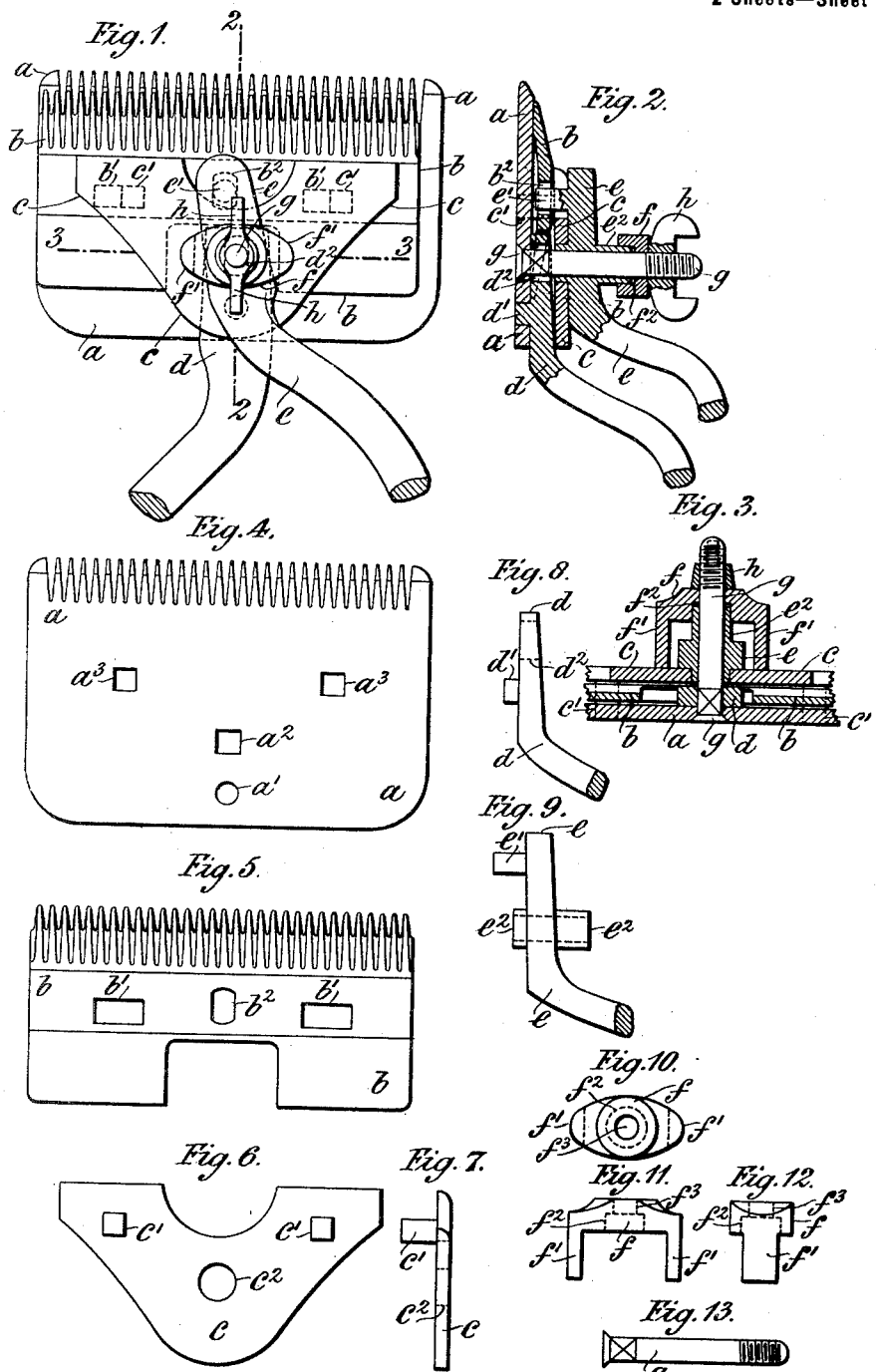
Witnesses.
Inventor.

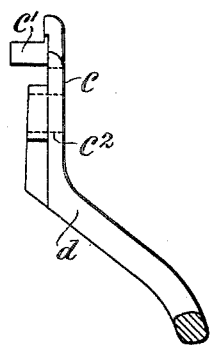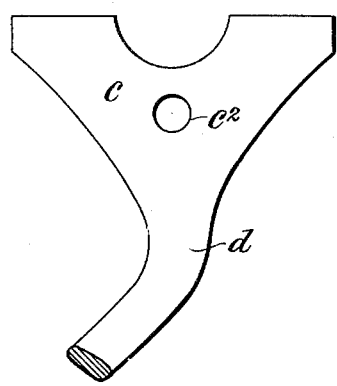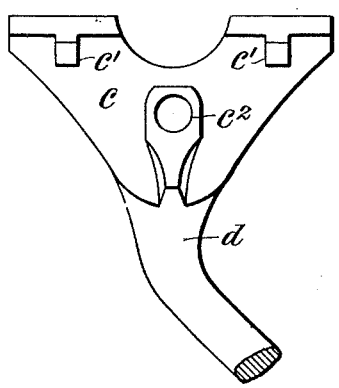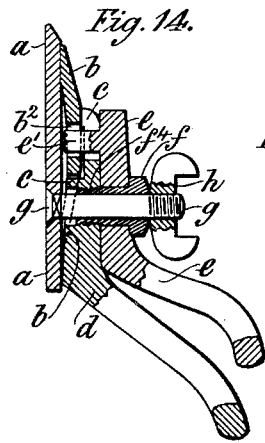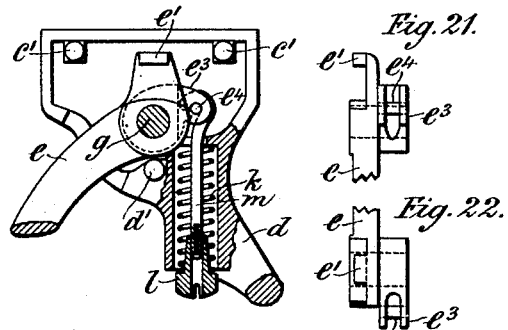

UNITED STATES PATENT OFFICE.

ALBERT MARTIN, OF LONDON, ENGLAND.

APPARATUS FOR CUTTING HUMAN HAIR OR CLIPPING ANIMALS.

SPECIFICATION forming part of Letters Patent No. 675,492, dated June 4, 1901.

Application filed November 19, 1900. Serial No. 36,928. (No model.)

*To all whom it may concern:*

Be it known that I, ALBERT MARTIN, horse-clipper manufacturer, a subject of the Queen of Great Britain, residing at 229 Burrage road, Plumstead, London, England, have invented certain new and useful Apparatus for Cutting Human Hair or Clipping Animals, of which the following is a specification.

According to this invention all the parts of the apparatus are held together by a single screw, about which the movable handle turns, the arrangement being such that by turning a nut on the screw the pressure between the cutter-plates is increased without tightening the movable handle.

Figure 1 is a plan of the clipper, the handles being broken away. Figs. 2 and 3 are sections on the lines 2 2 and 3 3, Fig. 1. Figs. 4 to 13 are detached views of the various parts. Fig. 4 is a plan of the lower cutter-plate $a$. Fig. 5 is a plan of the upper cutter-plate $b$. Fig. 6 is an under side view, and Fig. 7 an edge view, of the presser-plate $c$. Fig. 8 is an edge view of lower handle $d$, and Fig. 9 is a similar view of the upper or movable handle $e$. Fig. 10 is a plan, Fig. 11 a side elevation, and Fig. 12 an end elevation, of the bridge-piece $f$. Fig. 13 is a side view of the screw $g$. Figs. 14 to 19 show a modification. Fig. 14 is a similar view to Fig. 2. Fig. 15 is an under side view. Fig. 16 a plan, and Fig. 17 an edge view, of the lower handle $d$ and presser-plate $c$, which are made in one piece. Fig. 18 is a plan, and Fig. 19 a side elevation, of the sleeve $f$ and its prolongation $f^4$. Figs. 20 to 22 show the manner in which a spring is applied to the handles. Fig. 20 is an under side view of the clipper with the cutter-plates removed. Fig. 21 is a side elevation, and Fig. 22 an end elevation, of the nose of the movable handle.

In Figs. 1 to 13, $a$ is the lower cutter-plate, having in it four holes $a'$ $a^2$ $a^3$ $a^3$. $b$ is the upper cutter-plate, having in it three elongated holes $b'$ $b'$ $b^2$. $c$ is the presser-plate, having on it two lugs $c'$ $c'$, which pass through the holes $b'$ and $a^3$, thus serving as guide-blocks for the upper cutter-plate. The presser-plate also has a hole $c^2$ through it. $d$ is the lower handle, having on it a lug $d'$, which fits into the hole $a'$ in the cutter-plate $a$. The handle also has a hole $d^2$ through it. $e$ is the upper or movable handle, having on it a lug $e'$, which works in the hole $b^2$ in the upper cutter-plate. The handle $e$ has a sleeve $e^2$ made in one piece with it. The lower part of this sleeve fits into the hole $c^2$ in the presser-plate. $f$ is a bridge-piece bearing on the presser-plate $c$ and bridging over without touching the handle $e$. The bridge-piece is in the form of a sleeve $f$, provided with two legs $f'$, bearing on the presser-plate. It has in it a recess $f^2$, into which the upper part of the sleeve $e^2$ fits, and a hole $f^3$ through it. $g$ is a screw which passes through the holes $a^2$ and $d^2$, sleeve $e^2$, and hole $f^3$, its upper end being provided with a nut $h$. On turning the nut the bridge-piece $f$ forces the presser-plate $c$ downward, so pressing the teeth of the cutter-plates $a$ and $b$ together. It will be observed that the presser-plate only takes a bearing in three places—namely, along the front edges of its two limbs on the plate $b$ and at its rearmost point on the handle $d$. This construction causes the teeth of the two cutter-plates to be very evenly pressed together. It will also be observed that turning the nut $h$ does not force the handle $e$ downward, a small amount of play being allowed between the top of the sleeve $e^2$ and the bridge-piece.

The arrangement shown in Figs. 14 to 19 differs from that just described in that the presser-plate $c$ is made in one with the handle $d$. The legs $f'$ of the sleeve $f$, which bear on the presser-plate are replaced by a tubular prolongation $f^4$, which screws into the hole $c^2$ in the presser-plate $c$. The sleeve $f$ may in this case be in contact with the handle $e$, and the friction between the handle and the presser-plate may be regulated by turning the sleeve. This friction in this case also is not altered by turning the nut $h$, whereby the pressure between the cutter-plates $a$ and $b$ is regulated. In other respects the arrangement is similar to that first described. The two modifications embodied in this arrangement are independent of each other and can be adopted separately.

Figs. 20 to 22 show the manner in which a spring may be applied to these clippers to enable them to be used with one hand. The handle $e$ is provided with a prolongation or crank $e^3$, and the handle $d$ has a hole or tube bored in it. In this tube is a helical spring $k$, having one end bearing against a flange at the inner end of the tube and its other end against the nut $l$, which screws onto the connecting-rod $m$, hooked onto a crank-pin $e^4$ on the crank $e^3$. The spring $k$ is of sufficient diameter to allow the rod to oscillate about the nut as a hinge. By turning the nut $l$ the compression of the spring $k$ can be adjusted.

It will be observed that the crank $e^3$ and rod $m$ are at an acute angle to each other, and this angle becomes more and more acute as the handles approach each other, the result being to equalize the effect of the spring, for as the compression of the spring becomes more and more its leverage becomes less and less.

What I claim is—

1. The combination of a lower cutter-plate, an upper cutter-plate, a presser-plate above the upper cutter-plate, a lower handle, an upper handle, a screw connected to the lower cutter-plate and around which the upper handle turns, a sleeve on the screw engaging the presser-plate but separated from the handles and out of bearing contact therewith, and a nut on the screw bearing on the sleeve.

2. The combination of a lower cutter-plate, an upper cutter-plate, a lower handle bearing on the lower cutter-plate, a presser-plate whose front edge rests on the upper cutter-plate, an upper handle, a screw connected to the lower cutter-plate and around which the upper handle turns, a sleeve on the screw bearing on the presser-plate, and a nut on the screw bearing on the sleeve.

3. The combination of a lower cutter-plate, an upper cutter-plate, a lower handle and presser-plate made in one piece, the handle bearing on the lower cutter-plate and the front edge of the presser-plate on the upper cutter-plate, a screw connected to the lower cutter-plate and around which the upper handle turns, a sleeve on the screw engaging the presser-plate and a nut on the screw bearing on the sleeve.

4. The combination of a lower cutter-plate, an upper cutter-plate, a presser-plate above the upper cutter-plate, a lower handle, an upper handle, a screw connected to the lower cutter-plate and around which the upper handle turns, a sleeve on the screw bearing on the presser-plate, a nut on the screw bearing on the sleeve, two lugs on the presser-plate passing through slots in the upper cutter-plate and engaging with holes in the lower cutter-plate and a lug on the upper handle engaging with a slot in the upper cutter-plate.

5. The combination of a lower cutter-plate, an upper cutter-plate, a lower handle bearing on the lower cutter-plate, a presser-plate whose front edge rests on the upper cutter-plate, an upper handle, a screw connected to the lower cutter-plate and around which the upper handle turns, a sleeve on the screw bearing on the presser-plate, a nut on the screw bearing on the sleeve, two lugs on the presser-plate passing through slots in the upper cutter-plate and engaging with holes in the lower cutter-plate and a lug on the upper handle engaging with a slot in the upper cutter-plate.

6. The combination of a lower cutter-plate, an upper cutter-plate, a lower handle and presser-plate made in one piece, the handle bearing on the lower cutter-plate and the front edge of the presser-plate on the upper cutter-plate, a screw connected to the lower cutter-plate and around which the upper handle turns, a sleeve on the screw engaging the presser-plate, a nut on the screw bearing on the sleeve, two lugs on the presser-plate passing through slots in the upper cutter-plate and engaging with holes in the lower cutter-plate and a lug on the upper handle engaging with a slot in the upper cutter-plate.

7. The combination of a lower cutter-plate, an upper cutter-plate, a lower handle connected to the lower cutter-plate, an upper handle pivoted to the lower cutter-plate and operating the upper cutter-plate and a presser-plate forked at the front and having the front edges of its two branches bearing on the upper cutter-plate.

8. The combination of a lower cutter-plate, an upper cutter-plate, a handle and forked presser-plate made in one piece, the handle being connected to and bearing upon the lower cutter-plate and the front edges of the two branches of the presser-plate engaging the upper cutter-plate and an upper handle pivoted to the lower cutter-plate and operating the upper cutter-plate.

ALBERT MARTIN.

Witnesses:
FREDK. C. WEATHERLY,
WALTER J. SKERTEN.